April 13, 1937.　　　　C. W. LA PIERRE　　　　2,077,242

RECORD CHART QUANTITY INDICATION

Filed Nov. 23, 1933

Inventor:
Cramer W. LaPierre,
by Harry E. Dunham
His Attorney.

Patented Apr. 13, 1937

2,077,242

UNITED STATES PATENT OFFICE 2,077,242

RECORD CHART QUANTITY INDICATION

Cramer W. La Pierre, Schenectady, N. Y., assignor to General Electric Company, a corporation of New York Application November 23, 1933, Serial No. 699,357

2 Claims. (Cl. 283—1)

My invention relates to methods and arrangements for indicating the amount of sheet material remaining on a roll of such material, or the amount of such material already used, and has for its principal object the provision of a simple arrangement for producing a visual indication on the sheet itself without using additional equipment. Other and further objects and advantages will become apparent as the description proceeds.

My invention is particularly applicable to arrangements for determining the amount of record chart remaining unused in recording instruments and will be described in connection with the record roll of a recording instrument. It will be understood, however, that my invention is not limited to such use.

In recording instruments of the strip chart type as ordinarily constructed with enclosing casings, the roll from which the record strip is unwound is obscured from view so that it is not possible to determine how soon it will be necessary to renew the roll of record strip without opening or removing the enclosing casing. It is accordingly an object of my invention to provide a visual indication, observable through the window of the record chart, of the amount of chart remaining unused.

In accordance with my invention in its preferred form, the record strip is marked by means of perforations, notches, ink marks, or in any other suitable manner before the record strip is inserted in the recording instrument. The spacing between the markings is varied progressively from one end of the strip to the other so that, from the spacing between the markings, the observer can readily determine to what extent the record roll has been used. For convenience, a scale may be provided in the recording instrument, calibrated in terms of the amount of record strip remaining.

The record strip may, if desired, be marked by rolling up the strip to form a cylinder, and placing markings along a radius of the cylindrical record roll. Then, as the roll is unwound, since the radius continuously becomes shorter, the circumference of the roll, and consequently the spacing between the marks, decreases.

Figure 1:
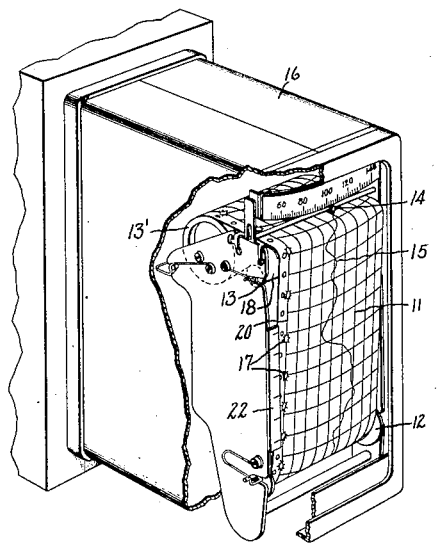
Figure 2:
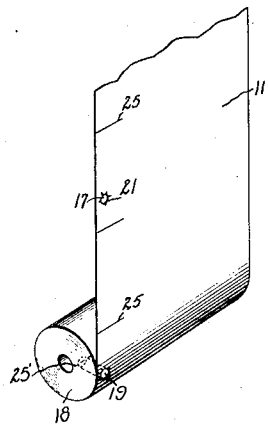
Figure 5:
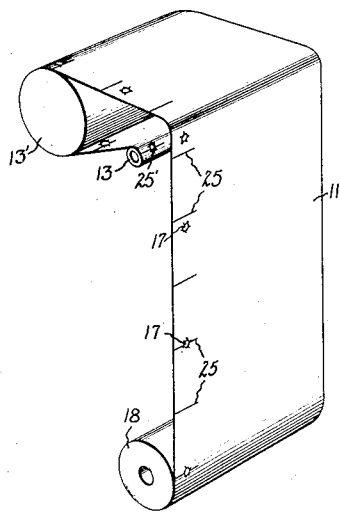
Figure 3:
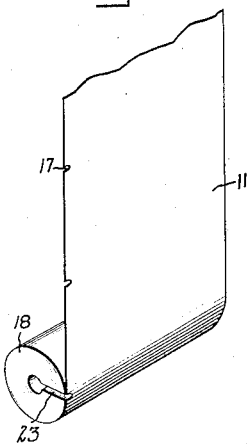
Figure 4:
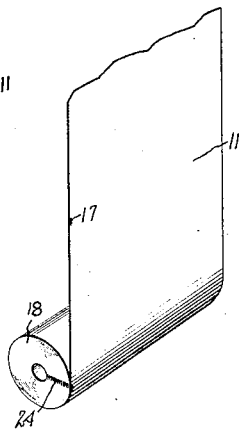

The features of my invention, which I believe to be novel and patentable, will be pointed out in the claims appended hereto. A better understanding of my invention itself, however, may be obtained by referring to the following description taken in connection with the accompanying drawing, in which Fig. 1 represents in perspective a recording instrument with a portion of the casing broken away in order to expose the interior mechanism and in which one embodiment of my invention is employed; Fig. 2 represents the record strip employed in the embodiment of Fig. 1 and illustrates the manner in which the marking is made on the roll; Figs. 3 and 4 represent modified marking arrangements; and Fig. 5 represents an arrangement in which a scale for measuring depletion of the record strip is printed on the strip.

Referring now more in detail to the drawing in which like reference characters refer to like parts throughout, in the arrangement of Fig. 1, a record chart or strip 11 is carried by the spools 12 and 13. The chart 11 cooperates with a marking pen 14 in order to produce a continuous record curve 15, providing a continuous record of the values of a variable quantity in a manner which is well understood in the art and does not form a part of the present invention. In the operation of a recording instrument of this type, the chart is moved along, ordinarily at a uniform rate, by means not shown so that it is gradually unwound from one spool and wound onto the other spool. In the form of chart shown in Fig. 1, the direction of motion of the chart is ordinarily downward so that the chart is unrolled from a spool 13, passing around the drum 13', and rolled onto a spool 12 so that the radius of the roll on the spool 12 continuously increases while the radius of the roll on spool 13 continuously decreases.

In order that the quantity of unused record chart remaining on the spool 13 may be determined without opening the casing 16 of the recording instrument, I provide markings 17 on the record chart 11. These markings are preferably placed on the record strip while it is on a roll and before it is placed in a recording instrument. The markings 17 are not uniformly spaced along the strip but the spacing is progressively varied, becoming greater or less as the chart is used, depending upon the manner in which the chart has been prepared. For example, in the type of marking used in the embodiment of Figs. 1 and 2, a roll 18 of record strip is provided with the markings 17 by drilling a hole 19 radially into the roll preferably near one end so as to come along the zero line 20 of the chart, or in any other suitable position so as not to interfere with the marking pen 14 or to obscure the record 15. The hole 19 is preferably of very small bore and the markings may be made more visible, if desired, by dropping ink into the hole 19 so as to discolor the edges of the perforations 17, thereby leaving a colored fringe 21 around each perforation 17.

If the record strip 11 is prepared as shown in Fig. 2 and then slipped into place on the spool 13, it will be obvious that the markings 17 will be farthest apart when the entire strip is wound on the roll 13, and will gradually become closer and closer together as the chart is rolled up on spool 12.

An estimate of the amount of chart remaining on the spool 13 can readily be made by observing the distance between the markings 17. In order to obtain a closer indication, a scale 22 may be provided, calibrated in terms of the amount of chart remaining. For example, when the spacing between the markings 17 corresponds to the spacing between the divisions at the remote ends of the scale 22, the chart 11 is at the beginning of its use and, when the spacing between the markings 17 corresponds to the spacing between adjacent divisions on the scale 22, the chart 11 is fully used and has been unwound from spool 13. For the sake of illustration, I have described an arrangement in which the spacing between the markings decreases as the chart is used, but it will be understood that the chart 11 many also be so arranged that the spacing between the markings increases as the chart is used by drilling the hole 19 into a roll which is rewound onto the spool 13. It will be understood, of course, that if a closer spacing of all the markings 17 is desired, two or more holes, preferably equidistant angularly, may be drilled into the roll 18 instead of merely the single hole 19.

While I have described the method of producing the markings 17 by means of drilling the hole 19 to produce perforations as being a convenient method of producing the markings, it will be understood that I am not limited to this exact arrangement. For example, in the arrangement of Fig. 3, the markings are produced in the form of notches along the edge of the strip 11, produced by cutting the end of the roll 18 by means of a milling cutter, a saw, or any other suitable tool.

In the arrangement of Fig. 4, the marks are produced by drawing an ink line 24 radially across the end of the roll 18. A suitable ink is employed which penetrates a short distance into the paper of which the roll 11 is composed so that a series of ink spots 17 is produced along the edge of the strip 11.

In the arrangement shown in Fig. 5, the scale 22 is eliminated and a scale is printed directly on the record strip in the form of uniformly spaced lines or marks 25. In providing the record strip with the variably spaced markings 17, the radial series of markings, e. g., the hole 19 in the arrangement of Fig. 2, is preferably so placed that the bottom of the hole and therefore the inmost of the variably spaced markings 17, coincides in position or is aligned with the inmost of the uniformly spaced scale lines 25, e. g., the scale line 25' at the end of the sheet. Although the spacing of the uniformly spaced scale lines 25 may be made equal to either the minimum spacing or the maximum spacing of the markings 17, or a multiple thereof, preferably it is made equal to the minimum spacing. If the latter is the case, as the end of the roll is approached, the spacing between markings 17 will become more and more nearly equal to that between the scale lines 25, and the markings 17 will come more and more nearly in alignment with the scale lines 25, thereby indicating very precisely the amount of strip chart remaining on spool 13 at any time. If desired, the markings of the sets 17 and 25 may also be aligned at the beginning of the roll, or at some other reference point in the record chart instead. It will be understood that, in Fig. 5, the rate of change of spacing between markings 17 is greatly exaggerated in order to represent at the bottom of the chart the appearance where the spacing is nearly a maximum and at the top the appearance where the spacing is approaching a minimum. Obviously, in the actual apparatus, the variation in spacing within the length of chart visible at any one time is scarcely perceptible.

The invention provides a notice to the chart reader or other attendant at all times of the amount of unused chart remaining in the instrument whereby he may accurately anticipate the time when a new chart roll will be required without opening the instrument. Even if the supply roll can be seen the invention provides a more accurate way of determining the amount of unused chart than can otherwise be arrived at by merely observing the diameter of the roll.

In accordance with the provisions of the patent statutes, I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States is:

1. A method of preparing a strip chart to provide indications of the amount of chart remaining unused which comprises forming the strip chart into a roll and making a radial mark across the end of the roll.

2. The method of producing a series of markings in a longitudinal row on a strip of sheet material and causing the spacing of the markings to vary progressively, which comprises rolling up the strip to form a cylinder and passing a marking implement along a radius of said cylinder.

CRAMER W. LA PIERRE.